March 19, 1957  R. C. SACKSTEDER  2,785,872
UNIVERSAL SWIVEL
Filed May 17, 1954
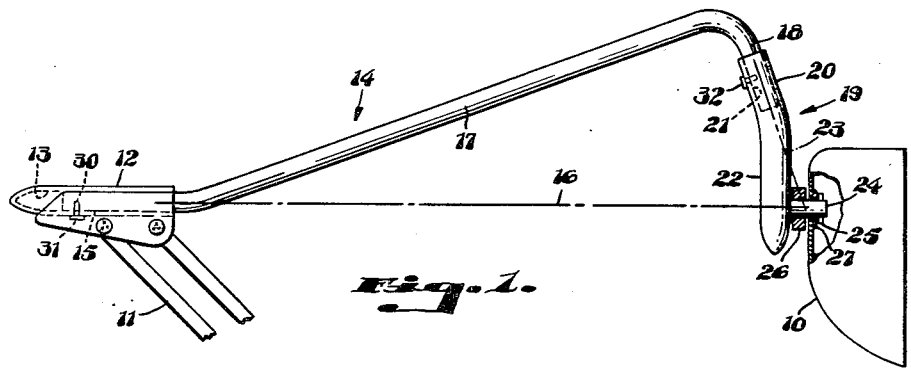
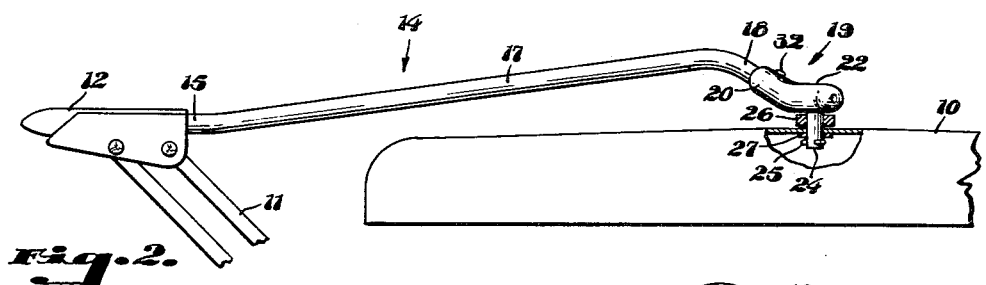
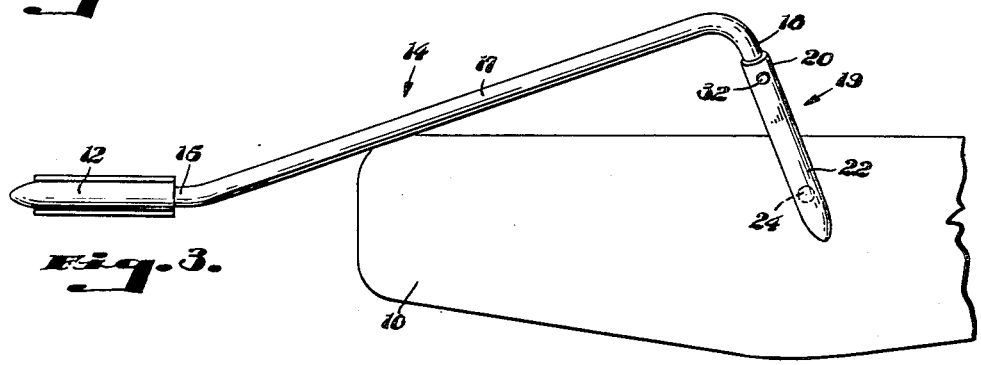
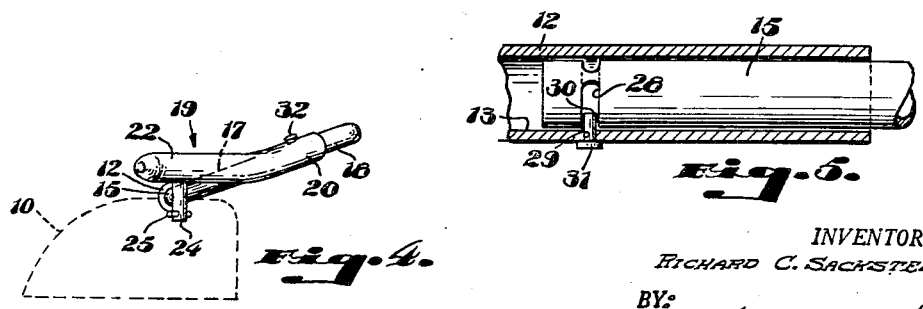
INVENTOR.
RICHARD C. SACKSTEDER,
BY: Harold B. Hood
ATTORNEY.

United States Patent Office 2,785,872
Patented Mar. 19, 1957

2,785,872
UNIVERSAL SWIVEL

Richard C. Sacksteder, Elwood, Ind., assignor to General Lamps Manufacturing Corporation, Elwood, Ind., a corporation of Indiana Application May 17, 1954, Serial No. 430,022

10 Claims. (Cl. 248—278)

The present invention relates to a universal swivel through which a load may be mounted in such a way as to assume substantially any desired attitude in space, and to maintain any attitude to which it is adjusted. When the load to be supported is relatively heavy, the friction in a conventional swivel arrangement, required to maintain the load in any selected position of adjustment, must be of so great a value as to render manual adjustment of the assembly intolerably difficult. It is known that, in such an assembly, if the load is so supported as to be capable of revolving about any one of three mutually perpendicular axes, all of which pass through the center of gravity of the revolvable assembly, this particular difficulty will be overcome; but the requirement that the three axes shall be mutually perpendicular, in such an organization, makes the organization objectionably large and awkward.

It is the primary object of the present invention to provide a universal swivel for supporting a load in such fashion that the load may assume, and will maintain, substantially any desired attitude, while overcoming the requirement for heavy friction, of conventional swivels, and avoiding the bulk and clumsiness of swivel assemblies in which the three axes must be mutually perpendicular. This object is accomplished by means of structure in which the three axes substantially intersect substantially at the center of gravity of the revolvable mass, but at acute angles.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 1 is a side elevation of an embodiment of the present invention;

Fig. 2 is a similar view, showing the parts in a different position of adjustment;

Fig. 3 is a plan view with the parts adjusted as in Fig. 2;

Fig. 4 is an end elevation taken from the right of Fig. 3; and

Fig. 5 is an enlarged, fragmentary sectional view of a detail.

The structure of the present invention has been designed primarily as a support for a lighting fixture, and it has been illustrated and will be described in that environment, though it will be readily apparent that any desired kind of load may be supported by the swivel mount of the present application. As shown, a lighting fixture comprising a shell 10 formed with a perforation therethrough is adapted to be supported, through the swivel mount about to be described, from a carrier, indicated by the reference numeral 11, and which may preferably be constructed in accordance with the disclosure of my co-pending application Serial No. 430,021, filed May 17, 1954, for Adjustable Weight Supporting Mechanism.

An element 12 which, in the illustrated embodiment of the invention, is formed with a substantially cylindrical socket 13, is supported from the carrier 11 or any other suitable supporting means; and a bar, indicated generally by the reference numeral 14, is mounted for oscillation about the axis of said socket 13 by the telescopic entry of a first end portion 15 of said bar within said socket 13. An extension of the axis of the socket 13 is indicated by the broken line 16 in Fig. 1, and it will be obvious that, of course, the axis of the bar-end portion 15 will be coincident with said socket axis.

The bar 14 comprises, further, an intermediate portion 17 whose axis is inclined, at a selected acute angle, to the extension of the socket axis 16. In the illustrated embodiment of the invention, the angle included between the axis of the intermediate portion 17 and the axis 16 is 20°.

The second end portion 18 of the bar 14 lies with its axis perpendicular to the axis of the intermediate portion 17, and projects toward the extension of the axis of the first bar-end portion 15, the axes of the three bar portions lying in a common plane.

A neck piece is indicated generally by the reference numeral 19; and one end portion 20 of said neck piece is formed to provide a socket 21 telescopically sleeved upon the bar-end portion 18, whereby the neck piece 19 is oscillable about the axis of said bar-end portion 18. The neck piece 19 comprises, also, a portion 22 whose axis is inclined to the extension 23 of the axis of the neck piece portion 20 at an angle equal to the angle included between the axis of the intermediate portion 17 and the axis extension 16.

The portion 22 of the neck piece 19 carries a post 24, whose axis is perpendicular to the axis of said neck piece portion 22; and the parts are preferably so proportioned and designed that, when arranged in the relationship illustrated in Fig. 1, the axis of the post 24 is coincident with the extension 16 of the axis of the socket 13. The lighting fixture is mounted upon the assembly by projecting the post 24 through the perforation of the shell 10, and providing suitable stop means for preventing removal thereof. In the illustrated embodiment of the invention, such stop means comprises a pin 25 passing through a transaxial bore in the post 24; and preferably, friction-reducing means, such as the washer 26 will be interposed between the shell 10 and the neck piece 19, and similar means, such as the washer 27 will be interposed between the shell 10 and the pin 25.

It will be obvious that the extension 16 of the axis of the first bar-end portion 15, the extension 23 of the axis of the second bar-end portion 18, and the axis of the post 24 substantially intersect in a common point; and, if the perforation in the shell 10 is properly located, that common point will lie substantially at the center of gravity of the assembly comprising the bar 14, the neck piece 19 and the load 10. The bar 14 may be bodily revolved about the axis of its end portion 15, the neck piece 19 may be bodily revolved about the axis of its portion 20, and the load may be bodily revolved about the axis of the post 24, all without disturbing the point of intersection of these axes (that is, the center of gravity of the system), and therefore without disturbing the equilibrium of the system.

Means will be provided, of course, for restraining the bar 14 against movement relative to the element 12 in the direction of the axis of said element, and means will be provided for similarly restraining the neck piece 19 relative to the bar-end 18. As shown, the bar-end 15 is formed with a peripherally-extending groove 28; and the element 12 is formed with a radial bore 29 in which is snugly but reciprocably received a pin 30 having a head 31, the inwardly projecting end of said pin being receivable in the groove 28. As shown, the peripheral extent of the groove 28 is slightly less than 360°, and I presently believe this arrangement to be desirable for reasons which will be obvious; but it is not essential.

A similar pin 32 carried by the portion 20 of the neck piece 19 is receivable in a similar groove (not shown) in the bar-end portion 18.

As has been said, the three axes of revolution embodied in the illustrated structure are not mutually perpendicular. Viewed in three dimensional space, the axis 23 is inclined relative to the axis 16 at an acute angle which is equal to the acute angle included between the axis 23 and the axis of the post 24. That angle should be as large as is compatible with neat design and I presently believe that a value of 60° is optimum.

I claim as my invention:

1. A universal swivel mount for a load comprising means providing a substantially cylindrical support, a bar having a first end portion telescopically engaged with, and supported from, said support for oscillation about the axis of said first end portion, an intermediate portion having an axis lying at an acute angle to an extension of said axis of said first end portion, and a second end portion having an axis angularly related to the axis of said intermediate portion and inclining toward said extension of said first end portion axis, the axes of said three bar portions lying substantially in a common plane, a neck piece telescopically engaged with, and supported from, said second end portion of said bar for oscillation about the axis of said second end portion, said neck piece having a portion angularly related to an extension of the axis of said second bar-end portion, and means carried by said last-named portion of said neck piece to support a load for oscillation about an axis meeting an extension of the axis of said second bar-end portion in an angle substantially equal to the angle included between said second named extension and an extension of the axis of said first bar-end portion.

2. The device of claim 1 in which the axis of said first bar-end portion, the axis of said second bar-end portion, and the axis of said load-supporting means substantially intersect substantially at the center of gravity of the assembly comprising said bar, said neck piece and the load.

3. The device of claim 1 in which said last-named axis, in one position of the parts, substantially coincides with said extension of the axis of said first end portion of said bar, and, in another position of said parts, perpendicularly intersects said extension.

4. A universal swivel mounting for a load comprising means providing a substantially cylindrical socket, a bar having a first end portion telescopically received within said socket for oscillation about the axis of said socket, the axis of said first bar-end portion coinciding with said socket axis, an intermediate portion having an axis lying at an acute angle to an extension of said axis of said first end portion, and a second end portion having an axis substantially perpendicular to the axis of said intermediate portion and inclining toward said extension of said first end portion axis, the axes of said three bar portions lying substantially in a common plane, a neck piece formed at one end with a substantially cylindrical socket telescopically sleeved on said second end portion of said bar, whereby said neck piece is supported from said bar for oscillation about the axis of said second bar-end portion, said neck piece having a portion lying at an angle to an extension of the axis of said second bar-end portion substantially equal to said first-named acute angle, and journal means on said last-named portion of said neck piece, said journal means defining an axis perpendicularly intersecting the axis of said last-named portion of said neck piece.

5. The device of claim 4 including means engaging said first-named means and said first bar-end portion to restrict relative axial movement thereof while permitting such oscillation, and means engaging said one end of said neck piece and said second bar-end portion to restrict relative axial movement thereof while permitting such oscillation.

6. The device of claim 4 including a pin seated in a wall of said first-named means and projecting into said first-named socket, said first bar-end portion being formed with a peripherally-extending groove receiving the inwardly-projecting portion of said pin, and a second pin seated in a wall of said one end portion of said neck piece and projecting into said neck piece socket, said second bar-end portion being formed with a peripherally-extending groove receiving the inwardly-projecting portion of said second pin.

7. The device of claim 4 in which said journal means is a post having a cylindrical portion, a lighting fixture including a shell formed with a perforation, said post passing through said perforation, and stop means carried by said post at a point beyond said shell perforation.

8. The device of claim 7 including friction-reducing means sleeved on said post and interposed between said shell and said neck piece.

9. The device of claim 8 including friction-reducing means sleeved on said post and interposed between said stop means and said shell.

10. The device of claim 4 in which the axis of said first bar-end portion, the axis of said second bar-end portion, and the axis of said journal means substantially intersect substantially at the center of gravity of the assembly comprising said bar, said neck piece and a load supported on said journal means.

References Cited in the file of this patent
UNITED STATES PATENTS

| | | |
|---|---|---|
| 1,050,321 | Winzenburg | Jan. 14, 1913 |
| 1,220,226 | Ott | Mar. 27, 1917 |
| 1,282,676 | Carlin | Oct. 22, 1918 |
| 1,734,522 | Kaufman | Nov. 5, 1929 |